(12) United States Patent
Miller et al.

(10) Patent No.: US 9,610,945 B2
(45) Date of Patent: Apr. 4, 2017

(54) COLLISION MITIGATION AND AVOIDANCE (71) Applicant: Ford Global Technologies, LLC, Dearborn, MI (US)

(72) Inventors: Alex Maurice Miller, Canton, MI (US); Roger Arnold Trombley, Ann Arbor, MI (US); Kun Deng, Ann Arbor, MI (US); Thomas Edward Pilutti, Ann Arbor, MI (US); Patrick Piastowski, Herne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/005,037

(22) Filed: Jan. 25, 2016

(65) Prior Publication Data

US 2016/0362104 A1 Dec. 15, 2016

Related U.S. Application Data

(60) Provisional application No. 62/173,796, filed on Jun. 10, 2015.

(51) Int. Cl.
*B60W 30/08* (2012.01)
*B60W 30/09* (2012.01)
*B60W 40/04* (2006.01)
*G07C 5/08* (2006.01)
*G07C 5/00* (2006.01)
*B60W 30/085* (2012.01)
*B60W 30/095* (2012.01)

(52) U.S. Cl.
CPC .......... *B60W 30/08* (2013.01); *B60W 30/085* (2013.01); *B60W 30/09* (2013.01); *B60W 30/0956* (2013.01); *B60W 40/04* (2013.01); *G07C 5/085* (2013.01); *G07C 5/008* (2013.01)

(58) Field of Classification Search
CPC .... B60W 30/08; B60W 30/085; B60W 30/09; B60W 40/04; B60W 30/0956; G07C 5/008; G07C 5/085
USPC ........................................................ 701/48
See application file for complete search history.

(56) References Cited

U.S. PATENT DOCUMENTS

| 6,405,132 B1 | 6/2002 | Breed et al. |
| 6,624,782 B2 | 9/2003 | Jocoy et al. |
| 2003/0016143 A1 | 1/2003 | Ghazarian |
| 2005/0090955 A1 | 4/2005 | Engelman et al. |
| 2007/0005609 A1 | 1/2007 | Breed |
| 2007/0276600 A1 | 11/2007 | King et al. |

(Continued)

FOREIGN PATENT DOCUMENTS

| CN | 1766232 A | 5/2006 |
| CN | 202057015 U | 11/2011 |

(Continued)

*Primary Examiner* — Anne M Antonucci
(74) *Attorney, Agent, or Firm* — Frank MacKenzie; Bejin Bieneman PLC (57) ABSTRACT

An intersection of a host vehicle and a target vehicle is identified. Data relating to the target vehicle are collected. A map of a surrounding environment is developed. A driver intent probability is determined based at least in part on the map. A threat estimation is determined based at least in part on the driver intent probability. At least one of a plurality of safety systems is activated based at least in part on the threat estimation.

20 Claims, 5 Drawing Sheets

(56) References Cited

U.S. PATENT DOCUMENTS

| | | |
|---|---|---|
| 2008/0114530 A1 | 5/2008 | Petrisor et al. |
| 2011/0082623 A1* | 4/2011 | Lu .................. B60W 10/06 701/41 |
| 2011/0298603 A1 | 12/2011 | King et al. |
| 2012/0095646 A1 | 4/2012 | Ghazarian |
| 2013/0026916 A1 | 1/2013 | Imaeda |
| 2014/0303882 A1 | 10/2014 | Jang et al. |
| 2014/0327532 A1 | 11/2014 | Park |
| 2014/0347207 A1 | 11/2014 | Zeng et al. |
| 2015/0057891 A1 | 2/2015 | Mudalige et al. |
| 2015/0106010 A1* | 4/2015 | Martin ................ G01C 21/34 701/410 |

FOREIGN PATENT DOCUMENTS

| | | |
|---|---|---|
| CN | 202868581 U | 4/2013 |
| CN | 103871272 A | 6/2014 |
| CN | 103898822 A | 7/2014 |
| CN | 104134370 A | 11/2014 |
| DE | 2012009555 A1 | 11/2012 |
| EP | 2001003 B1 | 4/2013 |
| GB | 2498438 A | 7/2013 |
| JP | H11175896 A | 7/1999 |
| JP | 200578265 A | 3/2005 |
| JP | 2005173703 A | 6/2005 |
| JP | 2005205983 A | 8/2005 |
| JP | 2009087372 A | 4/2009 |
| JP | 2009146219 A | 7/2009 |
| JP | 2014006609 A | 1/2014 |
| WO | 2010110109 A1 | 9/2010 |
| WO | 2011156621 A2 | 12/2011 |

* cited by examiner

FIG. 5

COLLISION MITIGATION AND AVOIDANCE

CROSS-REFERENCE TO PREVIOUSLY FILED APPLICATION

This application claims priority to U.S. Provisional Application Ser. No. 62/173,796 filed Jun. 10, 2015, which is hereby incorporated herein by reference in its entirety.

BACKGROUND

Vehicle collisions often occur at intersections. Collision mitigation may be difficult and expensive to implement. Current systems are often unable to make good, or any, use of various kinds of data. Further, current collision mitigation systems are lacking with respect to the ability to selectively use various data.

DESCRIPTION

Figure 1:
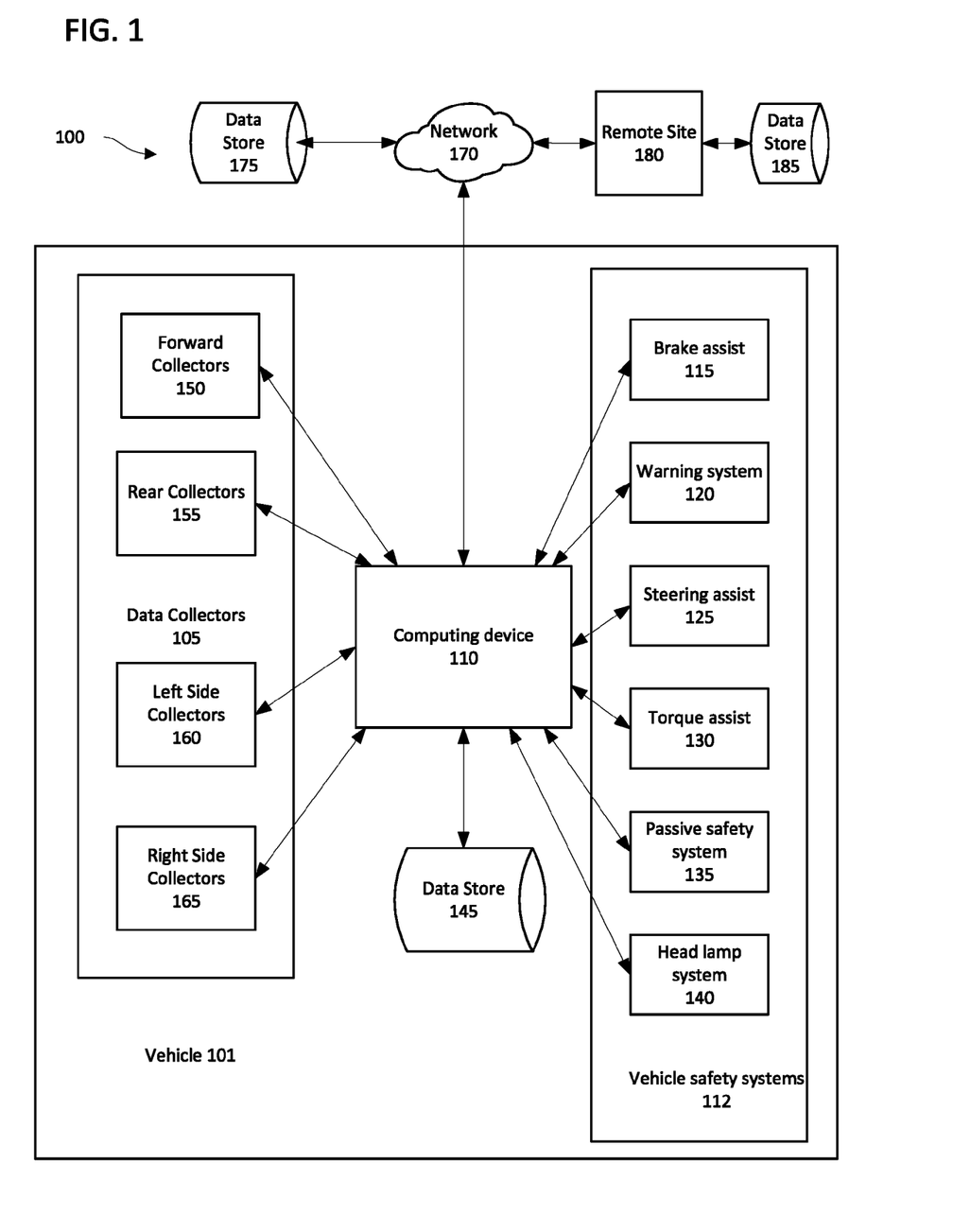
FIG. 1 is a system diagram of a collision mitigation system.

FIG. 1 illustrates a system 100 for intersection detection and collision mitigation. Unless indicated otherwise in this disclosure, an "intersection" is defined as a location where two or more vehicles' current or potential future trajectories cross. Thus, an intersection could be at any location on a surface where two or more vehicles could collide, e.g. a road, a driveway, a parking lot, an entrance to a public road, driving paths, etc. Accordingly, an intersection is determined by identifying a location where two or more vehicles may meet, i.e., collide. Such determination uses potential future trajectories of a host vehicle 101 as well as nearby other vehicles and/or other objects. As described in more detail below, using a selected, or "scaled" set of data collectors 110, future trajectories may be determined for one or more traffic scenarios involving a host vehicle 101 and/or a target vehicle, e.g., where the target vehicle is turning during the traffic scenario, where a target vehicle is closing on the host vehicle 101, etc.

The system 100 includes a vehicle 101 that in turn includes a plurality of data collectors 105 and a computing device 110. The vehicle 101 may further include a plurality of vehicle safety systems 112, e.g., a brake assist system 115, a warning system 120, a steering assist system 125, a torque assist system 130, a passive safety system 135, and a head lamp system 140. The vehicle 101 may further include a data store 145.

The system 100 includes a network 170 having a data store 175 and a remote site 180 having a data store 185. The network 170 can be used for communication between the vehicle computing device 110 and the remote site 180, or between several vehicles 101. The remote site 180 may include a social media site, a site providing navigation information, environmental informal, etc.

The computing device 110 includes a processor and a memory, the memory including one or more forms of computer-readable media, e.g., volatile and/or non-volatile storage as are known, the memory storing instructions executable by the processor for performing various operations, including as disclosed herein. Further, the computing device 110 may include more than one computing device, e.g., controllers or the like included in the vehicle 101 for monitoring and/or controlling various vehicle components, e.g., an engine control unit (ECU), transmission control unit (TCU), etc. The computing device 110 is generally configured for communications on an in-vehicle network and/or communications bus such as a controller area network (CAN) bus or the like. The computing device 110 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 105. Alternatively or additionally, in cases where the computer 105 actually comprises multiple devices, the CAN bus or the like may be used for communications between devices represented as the computing device 110 in this disclosure.

In addition, the computing device 110 may be configured for communicating with the network 170, which, as described below, may include various wired and/or wireless networking technologies, e.g., cellular, Bluetooth, wired and/or wireless packet networks, etc. Further, the computing device 110 generally includes instructions for receiving data, e.g., from one or more data collectors 105 and/or a human machine interface (HMI), such as an interactive voice response (IVR) system, a graphical user interface (GUI) including a touchscreen or the like, etc.

Using data received in the computing device 110, e.g., from data collectors 105, data included as stored parameters, the server, etc., the computing device 110 may control various vehicle 101 components and/or operations. For example, the computing device 110 may be used to regulate vehicle 101 speed, acceleration, deceleration, steering, etc.

The data collectors 105 may include forward data collectors 150 in a front of the vehicle 101, rear data collectors 155 in a rear of the vehicle 101, left side collectors 160 in a left side of the vehicle 101, and right side collectors 165 in a right side of the vehicle 101. The data collectors 105 may include any or all of radar, lidar, CMOS/CCD cameras, vehicle-to-vehicle communication (including but not limited to Dedicated Short Range Communication and Cellular Communication), Global Position System (GPS), and ultrasonics.

Data collectors 105 may include a variety of devices. For example, various controllers in a vehicle may operate as data collectors 105 to provide data via the CAN bus, e.g., data relating to vehicle speed, acceleration, etc. Further, sensors or the like, global positioning system (GPS) equipment, etc., could be included in a vehicle and configured as data collectors 105 to provide data directly to the computing device 110, e.g., via a wired or wireless connection. Data collectors 105 could also include sensors or the like for detecting conditions outside the vehicle 101, e.g., medium-range and long-range sensors. For example, sensor data collectors 105 could include mechanisms such as radar, lidar, sonar, cameras or other image capture devices, that could be deployed to measure a distance between the vehicle 101 and other vehicles or objects, to detect other vehicles or objects, and/or to detect road conditions, such as curves, potholes, dips, bumps, changes in grade, etc. In addition, data collectors 105 may include sensors internal to the vehicle 101, such as accelerometers, temperature sensors, motion detectors, etc. to detect motion or other conditions of the vehicle 101.

A memory of the computing device 110 generally stores collected data. Collected data may include a variety of data collected in a vehicle 101 from data collectors 105. Examples of collected data are provided above, and, moreover, data may additionally include data calculated therefrom in the computing device 110. In general, collected data may include any data that may be gathered by the data collectors 105 and/or computed from such data. Accordingly, collected data could include a variety of data related to vehicle 101 operations and/or performance, as well as data related to in particular relating to motion of the vehicle 101. For example, collected data could include data concerning a vehicle 101 speed, acceleration, longitudinal motion, lateral motion, pitch, yaw, roll, braking, etc.

A memory of the computing device 110 may further store one or more parameters. A parameter generally governs use of collected data. For example, a parameter may provide a threshold to which calculated collected data may be compared to determine whether an adjustment should be made to the component. Similarly, a parameter could provide a threshold below which an item of collected data, e.g., a datum from an accelerometer, should be disregarded.

Vehicle 101 components may include a variety of one or more elements of a vehicle 101. For example, as mentioned above, a component may be a video screen, a seat, a climate control system, a vehicle 101 interior or exterior mirror, etc.

The system 100 may be selectively scalable depending on the number of data collectors 105 incorporated. Specifically, the system 100 may include and selectively activate and/or receive and/or use data from one, some, or all of the following exemplary data collectors 105: forward looking radar (long, mid, and short range), front/side looking scanning lidar, forward looking CMOS (complimentary metal-oxide semiconductor)/CCD (charge-coupled device) camera (monocular or stereo, with and without active illumination FIR capability), forward looking ultrasonics (long, mid and short range), front right/left side radar (long, mid, and short range), front right/left side ultrasonics (long, mid, and short range), mid-vehicle mounted side looking CMOS/CCD camera, rear right/left side radar (long, mid, and short range), rear right/left side ultrasonics (long, mid, short range), rear looking radar (long, mid and short range), rear side rooking scanning lidar, rear looking ultrasonic sensors (long, mid and short range), rear looking CMOS/CCD camera (with and without active illumination FIR capability), vehicle-to-vehicle communication, e.g., DSRC (Dedicated Short Range Communication), cellular communication, etc., Global Position System (GPS), and electronic map of road/environment based on GPS location.

The computer 110 may be programmed to scalably receive and fuse (or integrate) collected data from some or all of the various data collectors 105 included in a vehicle 101. As used herein, "scalable" use or fusion of collected data means that the computer 105 is programmed to perform collision detection in part by identifying particular data collectors 105 for a particular determination of whether a collision is imminent or likely. That the system 100 is "scalable" further means that data collectors 105, and hence data collected therefrom, may be added and/or removed from a set of data collectors 105 being used from a first determination to a second determination of whether a collision is detected (and so on). The computer 110 is generally programmed to making scaling decisions, i.e., a determination of which data collectors 105 in the system 100 are to be used as sources for collected data to be used in a particular determination of whether a collision is possible.

For example, the front radar, camera, and lidar sensors can detect Turn Across Path scenarios, when the target vehicle turns in an arc into the forward trajectory of the host vehicle. For a Crossing Path scenario, however, side radar and lidar are required in addition to front radar, camera, and lidar. Thus, depending on whether the computer 110 detects a Turn Across Path or a Crossing Path, select data collectors 105 may be activated.

In another example, a wide field of view front-mounted camera can support vehicle length estimation for Turn Across Path, Crossing Path, and Brake-to-Pass scenarios. Front-facing radar and/or lidar could also be so-used. A Brake-to-Pass scenario is when the host vehicle accelerates or decelerates to avoid the target vehicle. Vehicle-to-vehicle communication enables occluded sensing field of view, such as when a second target vehicle is in front of the target vehicle out of view of the host vehicle. Electronic horizon and GPS may provide significant amount of infrastructure for mapping, such as stop bars, intersection types, lane types, paths, etc. Vehicle-to-infrastructure communication enables signal, phase, and timing sensing for traffic signals, including a period for a stoplight. A camera can also see the signal state of the traffic signal, such as when it is green, yellow, or red.

The computer 110 is generally further programmed to use collected data from data collectors 105, e.g., data including an environment around a vehicle 101, data available form a CAN bus relating to vehicle 101 speed, steering angle, acceleration, etc., to generate a three-dimensional digital road network map, providing a full X-Y-Z Cartesian road network coordinate system. This three-dimensional map provides significant advantages over a conventional polar coordinate tracking and target selection system. For example, using X-Y-Z Cartesian coordinates, the system 100 can determine the lateral velocity and acceleration of the vehicles in a vehicle path intersection.

Returning to FIG. 1, the network 170 represents one or more mechanisms by which the computing device 110 may communicate with a network data store 175 and/or a remote site 180 having a data store 185. Accordingly, the network 170 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The system 100 may determine the trajectories of a host vehicle 101 and a target object, e.g. a target vehicle 101, to determine whether an intersection and potential collision may occur between the host vehicle 101 and the target object. With data from the data collectors 105, the computer 110 may determine predicted trajectories for the host vehicle 101 and the target object.

Figure 5:
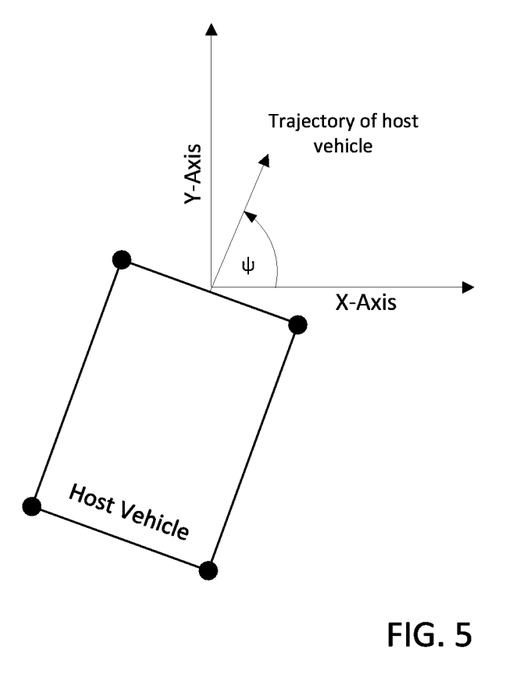
FIG. 5 illustrates a trajectory of the host vehicle.

The computer 110 may determine predicted paths for the corner points of the host vehicle 101. The host vehicle 101 has four corner points: a front right corner point, a front left corner point, a rear right corner point, and a rear left corner point. For the purposes of the following equations, the "front" refers to the frontmost end of the host vehicle 101, the "rear" refers to the rearmost end of the host vehicle 101, the "right" refers to the right side of the vehicle when facing the front end, and the "left" refers to the left side of the vehicle when facing the front end. Furthermore, this discussion refers to two directional axes: an "X" axis, defined as a line that is a shortest distance between left and right sides of a road, and a "Y" axis, defined as the axis that runs in a direction of the road, e.g., parallel to a road that is substantially straight, or at a tangent to a road whose direction is defined by a curve, the Y axis being orthogonal to the X axis. In general, when the vehicle 101 traverses a road, the forward motion of the car defines the positive Y axis, and the X axis points to the right relative to the positive Y direction. The host vehicle 101 may define a coordinate system with an origin point at the front left corner point of the host vehicle 101, where positive X points to the right relative to the front left corner point and positive Y points front relative to the front left corner point. The vehicle 101 trajectory may define an angle ψ, as shown in FIG. 5, relative to the X axis, where positive ψ is counterclockwise. While the discussion here focuses on the two axes X and Y, the data collectors 105 may be located at specific elevations along a Z orthogonal to the X and Y axes, and used to develop a two-dimensional map with X-Y axes and/or a three-dimensional map with Cartesian X-Y-Z axes.

Figure 4:
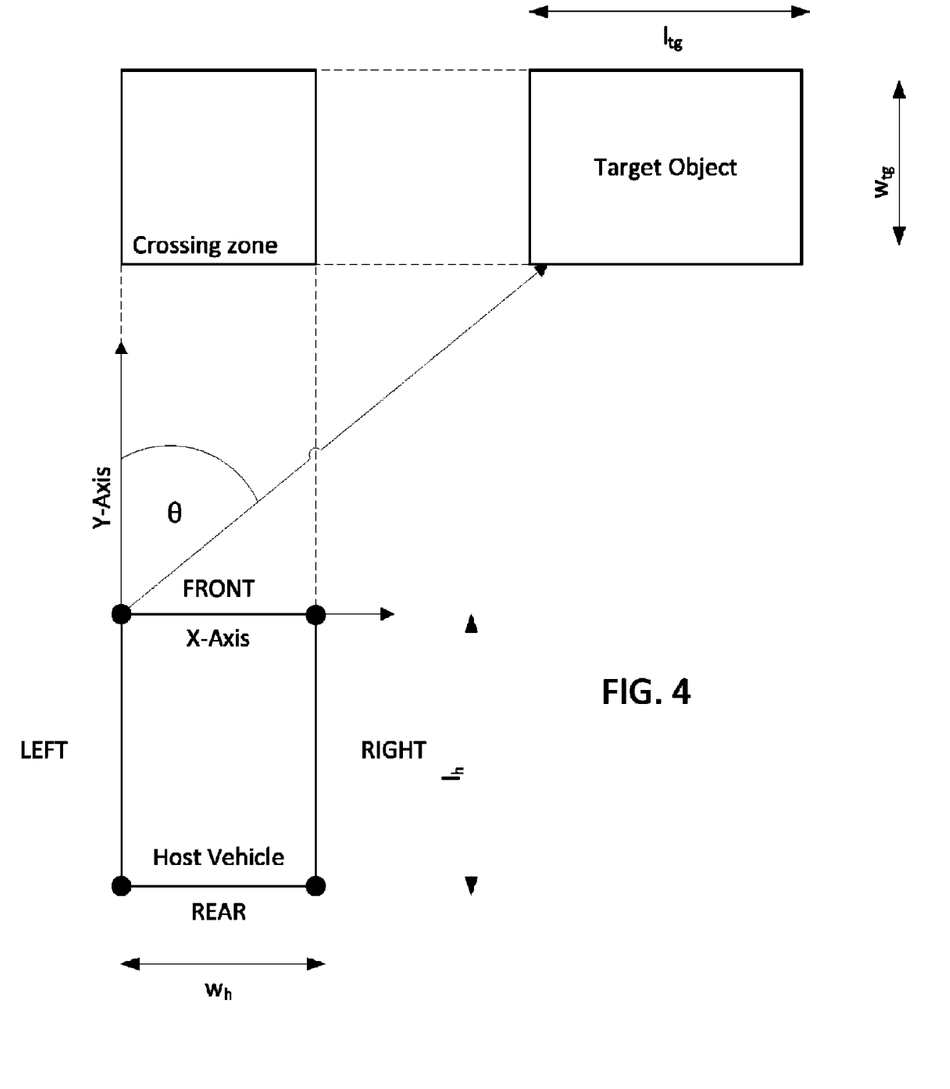
FIG. 4 illustrates a potential collision between a host vehicle and a target object.

The host vehicle 101 and the target vehicle 101 may define a crossing zone, as shown in FIG. 4. The crossing zone is defined as the potential space in the intersection where the host vehicle 101 may collide with the target vehicle 101, i.e., the area where the path of the host vehicle 101 may intersect the path of the target vehicle 101.

The data collectors 105 may provide data indication the host vehicle 101 dimensions with respect to the above-described coordinate system. Specifically, the width $w_h$ of the host vehicle 101 may be determined, where the $w_h$ is the distance from the front left point to the front right point along the X axis. Further, the length $l_h$ of the host vehicle 101 may be determined, where the $l_h$ is the distance from the front left point to the rear left point along the Y axis. One of the data collectors 105 may be a sensor for determining the paths of the corner points, and the position of the sensor in the vehicle 101 may be defined as $(\tilde{x}_h^m, \tilde{y}_h^m)$, where $\tilde{x}_h^m$ is the position of the sensor along the X axis and $\tilde{y}_h^m$ is the position of the sensor along the Y axis. The distance from the sensor to the front end $L_a$, the rear end $L_b$, the right side $L_c$, and the left side $L_d$ may be defined as:

$$L_a = -\tilde{y}_h^m \tag{1}$$

$$L_b = l_h + \tilde{y}_h^m \tag{2}$$

$$L_c = w_h - \tilde{x}_h^m \tag{3}$$

$$L_d = \tilde{x}_h^m \tag{4}$$

and the four corners may each be defined as the point where one of the ends meets one of the sides: the front left corner ad, the front right corner ac, the rear left corner bd, and the rear right corner bc.

At a given time t, a time step index j, and a time step, i.e., a period of time, ΔT, such that from the time t to a time t+T, the elapsed time T is divided into equal steps ΔT such that ΣΔT=T and $$j \in \left[0, \frac{T}{\Delta T}\right],$$

the data collector 105 may determine the trajectory of the host vehicle 101 by $$(\hat{X}^h(t+j\Delta T), \hat{Y}^h(t+j\Delta T), \hat{\psi}^h(t+j\Delta T)) \tag{5}$$

where $\hat{X}^h$ is the predicted position vector of the vehicle 101 along the X axis, $\hat{Y}^h$ is the predicted position vector of the vehicle 101 along the Y axis, and $\hat{\psi}^h$ is the predicted angle relative to the X axis defined by the predicted trajectory of the vehicle 101. Where $$x^m = \hat{X}^h(t+j\Delta T) \tag{6}$$

$$y^m = \hat{Y}^h(t+j\Delta T) \tag{7}$$

$$\psi = \hat{\psi}^h(t+j\Delta T) \tag{8}$$

the predicted location of the four corners can be determined by $$\begin{pmatrix} \hat{X}_{ad}^h(t+j\Delta T) \\ \hat{Y}_{ad}^h(t+j\Delta T) \end{pmatrix} = \begin{pmatrix} x^m + L_a\cos\psi - L_d\sin\psi \\ y^m + L_a\sin\psi + L_d\cos\psi \end{pmatrix} \tag{9}$$

$$\begin{pmatrix} \hat{X}_{ac}^h(t+j\Delta T) \\ \hat{Y}_{ac}^h(t+j\Delta T) \end{pmatrix} = \begin{pmatrix} x^m + L_a\cos\psi + L_c\sin\psi \\ y^m + L_a\sin\psi - L_c\cos\psi \end{pmatrix} \tag{10}$$

$$\begin{pmatrix} \hat{X}_{bd}^h(t+j\Delta T) \\ \hat{Y}_{bd}^h(t+j\Delta T) \end{pmatrix} = \begin{pmatrix} x^m - L_b\cos\psi - L_d\sin\psi \\ y^m - L_b\sin\psi + L_d\cos\psi \end{pmatrix} \tag{11}$$

$$\begin{pmatrix} \hat{X}_{bc}^h(t+j\Delta T) \\ \hat{Y}_{bc}^h(t+j\Delta T) \end{pmatrix} = \begin{pmatrix} x^m - L_b\cos\psi + L_c\sin\psi \\ y^m - L_b\sin\psi - L_c\cos\psi \end{pmatrix} \tag{12}$$

The index j increases by 1 and the next step in the path calculated until reaching a final time T, i.e., when $$j = \frac{T}{\Delta T}.$$

Thus, the predicted path $r^h$ of the four corners ad, ac, bd, bc of the vehicle 101 can be determined as the a matrix containing each time step:

$$r_{ad}^h = \{(\hat{X}_{ad}^h(t), \hat{Y}_{ad}^h(t)), \ldots, (\hat{X}_{ad}^h(t+T), \hat{Y}_{ad}^h(t+T))\} \tag{13}$$

$$r_{ac}^h = \{(\hat{X}_{ac}^h(t), \hat{Y}_{ac}^h(t)), \ldots, (\hat{X}_{ac}^h(t+T), \hat{Y}_{ac}^h(t+T))\} \tag{14}$$

$$r_{bd}^h = \{(\hat{X}_{bd}^h(t), \hat{Y}_{bd}^h(t)), \ldots, (\hat{X}_{bd}^h(t+T), \hat{Y}_{bd}^h(t+T))\} \tag{15}$$

$$r_{bc}^h = \{(\hat{X}_{bc}^h(t), \hat{Y}_{bc}^h(t)), \ldots, (\hat{X}_{bc}^h(t+T), \hat{Y}_{bc}^h(t+T))\} \tag{16}$$

The computing device 110 can determine the host vehicle 101 corner closest to the target vehicle 101. Like the host vehicle 101, the target vehicle has a width $w_{tg}$, a length $l_{tg}$, and position vectors $\hat{X}^{tg}$, $\hat{Y}^{tg}$, $\hat{\psi}^{tg}$. The target vehicle 101 may define an azimuth angle $\theta^{tg}$, defined as the angle between the position of the host vehicle 101 and the target vehicle 101 relative to the Y axis, where positive $\theta^{tg}$ is counterclockwise, i.e., when the host vehicle 101 sees the target vehicle 101 to the left of the host vehicle 101, the azimuth angle $\theta^{tg}$ is positive.

When the azimuth angle $\theta^{tg}(t)$ is negative at time t, i.e., $\theta^{tg}(t) < 0$, the target vehicle 101 is on the right of the host vehicle 101, the computing device 110 may determine which corner of the target vehicle 101 is closest to the host vehicle 101.

If $\hat{\psi}^{tg}(t)-\hat{\psi}^h(t) \in [0°, 90°)$, then distances for two possible corners $d_1$, $d_2$ may be defined by:

$$d_1 = \sqrt{\left(\hat{X}^h(t)-\hat{X}^{tg}(t)\right)^2 + \left(\hat{Y}^h(t)-\hat{Y}^{tg}(t)\right)^2} \tag{17}$$

$$d_2 = \sqrt{\begin{array}{l}\left(\hat{X}^h(t)-\hat{X}^{tg}(t)-l_{tg}\cos(\hat{\psi}^{tg}(t))\right)^2 + \\ \left(\hat{Y}^h(t)-\hat{Y}^{tg}(t)-l_{tg}\sin(\hat{\psi}^{tg}(t))\right)^2\end{array}} \tag{18}$$

If $d_1 < d_2$, then the rear left corner of the target vehicle 101 is the closest corner to the host vehicle 101; otherwise, the front left corner of the target vehicle 101 is the closest corner to the host vehicle 101.

If $\hat{\psi}^{tg}(t)-\hat{\psi}^h(t) \in [90°, 180°)$, then:

$$d_1 = \sqrt{\left(\hat{X}^h(t)-\hat{X}^{tg}(t)\right)^2 + \left(\hat{Y}^h(t)-\hat{Y}^{tg}(t)\right)^2} \tag{19}$$

$$d_2 = \sqrt{\begin{array}{l}\left(\hat{X}^h(t)-\hat{X}^{tg}(t)-w_{tg}\cos(\hat{\psi}^{tg}(t)-\frac{\pi}{2})\right)^2 + \\ \left(\hat{Y}^h(t)-\hat{Y}^{tg}(t)-w_{tg}\sin(\hat{\psi}^{tg}(t)-\frac{\pi}{2})\right)^2\end{array}} \tag{20}$$

If $d_1 < d_2$, then the front left corner of the target vehicle 101 is the closest corner to the host vehicle 101; otherwise, the front right corner of the target vehicle 101 is the closest corner to the host vehicle 101.

If $\hat{\psi}^{tg}(t)-\hat{\psi}^h(t) \in [180°, 270°)$, then distances for two possible corners $d_1$, $d_2$ may be defined by:

$$d_1 = \sqrt{\left(\hat{X}^h(t)-\hat{X}^{tg}(t)\right)^2 + \left(\hat{Y}^h(t)-\hat{Y}^{tg}(t)\right)^2} \tag{21}$$

$$d_2 = \sqrt{\begin{array}{l}\left(\hat{X}^h(t)-\hat{X}^{tg}(t)-l_{tg}\cos(\hat{\psi}^{tg}(t))-\pi\right)^2 + \\ \left(\hat{Y}^h(t)-\hat{Y}^{tg}(t)-l_{tg}\sin(\hat{\psi}^{tg}(t))-\pi\right)^2\end{array}} \tag{22}$$

If $d_1 < d_2$, then the front right corner of the target vehicle 101 is the closest corner to the host vehicle 101; otherwise, the rear right corner of the target vehicle 101 is the closest corner to the host vehicle 101.

If $\hat{\psi}^{tg}(t)-\hat{\psi}^h(t) \in [270°, 360°)$, then:

$$d_1 = \sqrt{\left(\hat{X}^h(t)-\hat{X}^{tg}(t)\right)^2 + \left(\hat{Y}^h(t)-\hat{Y}^{tg}(t)\right)^2} \tag{23}$$

$$d_2 = \sqrt{\begin{array}{l}\left(\hat{X}^h(t)-\hat{X}^{tg}(t)-w_{tg}\cos(\hat{\psi}^{tg}(t)+\frac{\pi}{2})\right)^2 + \\ \left(\hat{Y}^h(t)-\hat{Y}^{tg}(t)-w_{tg}\sin(\hat{\psi}^{tg}(t)+\frac{\pi}{2})\right)^2\end{array}} \tag{24}$$

If $d_1 < d_2$, then the rear right corner of the target vehicle 101 is the closest corner to the host vehicle 101; otherwise, the rear left corner of the target vehicle 101 is the closest corner to the host vehicle 101.

When the azimuth angle $\theta^{tg}(t)$ is positive at time t, i.e., $\theta^{tg}(t) \geq 0$, the target vehicle 101 is on the left of the host vehicle 101, the computing device 110 may determine which corner of the target vehicle 101 is closest to the host vehicle 101.

If $\hat{\psi}^{tg}(t)-\hat{\psi}^h(t) \in [0°, 90°)$, then distances for two possible corners $d_1$, $d_2$ may be defined by:

$$d_1 = \sqrt{\left(\hat{X}^h(t)-\hat{X}^{tg}(t)\right)^2 + \left(\hat{Y}^h(t)-\hat{Y}^{tg}(t)\right)^2} \tag{25}$$

$$d_2 = \sqrt{\begin{array}{l}\left(\hat{X}^h(t)-\hat{X}^t(t)-w_t\cos(\hat{\psi}^t(t)+\frac{\pi}{2})\right)^2 + \\ \left(\hat{Y}^h(t)-\hat{Y}^t(t)-w_t\sin(\hat{\psi}^t(t)+\frac{\pi}{2})\right)^2\end{array}} \tag{26}$$

If $d_1 < d_2$, then the rear right corner of the target vehicle 101 is the closest corner to the host vehicle 101; otherwise, the rear left corner of the target vehicle 101 is the closest corner to the host vehicle 101.

If $\hat{\psi}^{tg}(t)-\hat{\psi}^h(t) \in [90°, 180°)$, then:

$$d_1 = \sqrt{\left(\hat{X}^h(t)-\hat{X}^{tg}(t)\right)^2 + \left(\hat{Y}^h(t)-\hat{Y}^{tg}(t)\right)^2} \tag{27}$$

$$d_2 = \sqrt{\begin{array}{l}\left(\hat{X}^h(t)-\hat{X}^t(t)-l_t\cos(\hat{\psi}^t(t))\right)^2 + \\ \left(\hat{Y}^h(t)-\hat{Y}^t(t)-l_t\sin(\hat{\psi}^t(t))\right)^2\end{array}} \tag{28}$$

If $d_1 < d_2$, then the rear left corner of the target vehicle 101 is the closest corner to the host vehicle 101; otherwise, the front left corner of the target vehicle 101 is the closest corner to the host vehicle 101.

If $\hat{\psi}^{tg}(t)-\hat{\psi}^h(t) \in [180°, 270°)$, then distances for two possible corners $d_1$, $d_2$ may be defined by:

$$d_1 = \sqrt{\left(\hat{X}^h(t)-\hat{X}^{tg}(t)\right)^2 + \left(\hat{Y}^h(t)-\hat{Y}^{tg}(t)\right)^2} \tag{29}$$

$$d_2 = \sqrt{\begin{array}{l}\left(\hat{X}^h(t)-\hat{X}^t(t)-w_t\cos(\hat{\psi}^t(t)-\frac{\pi}{2})\right)^2 + \\ \left(\hat{Y}^h(t)-\hat{Y}^t(t)-w_t\sin(\hat{\psi}^t(t)-\frac{\pi}{2})\right)^2\end{array}} \tag{30}$$

If $d_1 < d_2$, then the front left corner of the target vehicle 101 is the closest corner to the host vehicle 101; otherwise, the front right corner of the target vehicle 101 is the closest corner to the host vehicle 101.

If $\hat{\psi}^{tg}(t)-\hat{\psi}^h(t) \in [270°, 360°)$, then:

$$d_1 = \sqrt{\left(\hat{X}^h(t)-\hat{X}^{tg}(t)\right)^2 + \left(\hat{Y}^h(t)-\hat{Y}^{tg}(t)\right)^2} \tag{31}$$

$$d_2 = \sqrt{\begin{array}{l}\left(\hat{X}^h(t)-\hat{X}^{tg}(t)-l_{tg}\cos(\hat{\psi}^{tg}(t))-\pi\right)^2 + \\ \left(\hat{Y}^h(t)-\hat{Y}^{tg}(t)-l_{tg}\sin(\hat{\psi}^{tg}(t))-\pi\right)^2\end{array}} \tag{32}$$

If $d_1 < d_2$, then the front right corner of the target vehicle 101 is the closest corner to the host vehicle 101; otherwise, the rear right corner of the target vehicle 101 is the closest corner to the host vehicle 101.

Based on which corner of the target vehicle 101 is closest to the host vehicle 101, the computing device 110 may determine a detection corner value $D_{corner}(t)$ referring to each corner, where:

$$D_{corner}(t) = \begin{cases} 1 & \text{front left corner} \\ 2 & \text{front right corner} \\ 3 & \text{rear left corner} \\ 4 & \text{rear right corner} \end{cases} \quad (33)$$

The computing device 110 may then determine the predicted path of the target vehicle 101. The computing device 110 may acquire the target vehicle width $w_{tg}$ and length $l_{tg}$ from the data collectors 105. For each time step index j, as described above, the computing device 110 may determine the corner of the target vehicle 101 closest to the host vehicle 101. The computing device 110 determines the trajectory of the target vehicle as:

$$(\hat{X}^{tg}(t+j\Delta T), \hat{Y}^{tg}(t+j\Delta T), \hat{\psi}^{tg}(t+j\Delta T)) \quad (34)$$

where $\hat{X}^{tg}$ is the predicted position vector of the target vehicle 101 along the X axis, $\hat{Y}^{tg}$ is the predicted position vector of the vehicle 101 along the Y axis, and $\hat{\psi}^{tg}$ is the predicted angle relative to the X axis defined by the predicted trajectory of the vehicle 101. Where $$x^m = \hat{X}^{tg}(t+j\Delta T) \quad (35)$$

$$y^m = \hat{Y}^{tg}(t+j\Delta T) \quad (36)$$

$$\psi = \hat{\psi}^{tg}(t+j\Delta T) \quad (37)$$

When $D_{corner}(t+j\Delta T)=1$, i.e., the closest corner of the host vehicle 101 to the target vehicle 101 is the front left corner of the host vehicle 101, the trajectories of the corners of the target vehicle 101 may be determined by $$\begin{pmatrix} \hat{X}_{ad}^{tg}(t+j\Delta T) \\ \hat{Y}_{ad}^{tg}(t+j\Delta T) \end{pmatrix} = \begin{pmatrix} x^m \\ y^m \end{pmatrix} \quad (38)$$

$$\begin{pmatrix} \hat{X}_{ac}^{tg}(t+j\Delta T) \\ \hat{Y}_{ac}^{tg}(t+j\Delta T) \end{pmatrix} = \begin{pmatrix} x^m + w_{tg}\cos(\psi - \frac{\pi}{2}) \\ y^m + w_{tg}\sin(\psi - \frac{\pi}{2}) \end{pmatrix} \quad (39)$$

$$\begin{pmatrix} \hat{X}_{bd}^{tg}(t+j\Delta T) \\ \hat{Y}_{bd}^{tg}(t+j\Delta T) \end{pmatrix} = \begin{pmatrix} x^m + l_{tg}\cos(\psi - \pi) \\ y^m + l_{tg}\sin(\psi - \pi) \end{pmatrix} \quad (40)$$

$$\begin{pmatrix} \hat{X}_{bc}^{tg}(t+j\Delta T) \\ \hat{Y}_{bc}^{tg}(t+j\Delta T) \end{pmatrix} = \begin{pmatrix} x^m + \sqrt{w_{tg}^2 + l_{tg}^2}\cos\left(\psi - \pi + \tan^{-1}\left(\frac{w_{tg}}{l_{tg}}\right)\right) \\ y^m + \sqrt{w_{tg}^2 + l_{tg}^2}\sin\left(\psi - \pi + \tan^{-1}\left(\frac{w_{tg}}{l_{tg}}\right)\right) \end{pmatrix} \quad (41)$$

When $D_{corner}(t+j\Delta T)=2$, i.e., the closest corner of the host vehicle 101 to the target vehicle 101 is the front right corner of the host vehicle 101, then $$\begin{pmatrix} \hat{X}_{ad}^{tg}(t+j\Delta T) \\ \hat{Y}_{ad}^{tg}(t+j\Delta T) \end{pmatrix} = \begin{pmatrix} x^m + w_{tg}\cos\left(\psi - \frac{3\pi}{2}\right) \\ y^m + w_{tg}\sin\left(\psi - \frac{3\pi}{2}\right) \end{pmatrix} \quad (42)$$

$$\begin{pmatrix} \hat{X}_{ac}^{tg}(t+j\Delta T) \\ \hat{Y}_{ac}^{tg}(t+j\Delta T) \end{pmatrix} = \begin{pmatrix} x^m \\ y^m \end{pmatrix} \quad (43)$$

$$\begin{pmatrix} \hat{X}_{bd}^{tg}(t+j\Delta T) \\ \hat{Y}_{bd}^{tg}(t+j\Delta T) \end{pmatrix} = \begin{pmatrix} x^m + \sqrt{w_{tg}^2 + l_{tg}^2}\cos\left(\psi - \pi + \tan^{-1}\left(\frac{w_{tg}}{l_{tg}}\right)\right) \\ y^m + \sqrt{w_{tg}^2 + l_{tg}^2}\sin\left(\psi - \pi + \tan^{-1}\left(\frac{w_{tg}}{l_{tg}}\right)\right) \end{pmatrix} \quad (44)$$

$$\begin{pmatrix} \hat{X}_{bc}^{tg}(t+j\Delta T) \\ \hat{Y}_{bc}^{tg}(t+j\Delta T) \end{pmatrix} = \begin{pmatrix} x^m + l_{tg}\cos(\psi - \pi) \\ y^m + l_{tg}\sin(\psi - \pi) \end{pmatrix} \quad (45)$$

When $D_{corner}(t+j\Delta T)=3$, i.e., the closest corner of the host vehicle 101 to the target vehicle 101 is the rear left corner of the host vehicle 101, then $$\begin{pmatrix} \hat{X}_{ad}^{tg}(t+j\Delta T) \\ \hat{Y}_{ad}^{tg}(t+j\Delta T) \end{pmatrix} = \begin{pmatrix} x^m + l_{tg}\cos(\psi) \\ y^m + l_{tg}\sin(\psi) \end{pmatrix} \quad (46)$$

$$\begin{pmatrix} \hat{X}_{ac}^{tg}(t+j\Delta T) \\ \hat{Y}_{ac}^{tg}(t+j\Delta T) \end{pmatrix} = \begin{pmatrix} x^m + \sqrt{w_{tg}^2 + l_{tg}^2}\cos\left(\psi - \tan^{-1}\left(\frac{w_{tg}}{l_{tg}}\right)\right) \\ y^m + \sqrt{w_{tg}^2 + l_{tg}^2}\sin\left(\psi - \tan^{-1}\left(\frac{w_{tg}}{l_{tg}}\right)\right) \end{pmatrix} \quad (47)$$

$$\begin{pmatrix} \hat{X}_{bd}^{tg}(t+j\Delta T) \\ \hat{Y}_{bd}^{tg}(t+j\Delta T) \end{pmatrix} = \begin{pmatrix} x^m \\ y^m \end{pmatrix} \quad (48)$$

$$\begin{pmatrix} \hat{X}_{bc}^{tg}(t+j\Delta T) \\ \hat{Y}_{bc}^{tg}(t+j\Delta T) \end{pmatrix} = \begin{pmatrix} x^m + w_{tg}\cos\left(\psi - \frac{\pi}{2}\right) \\ y^m + w_{tg}\sin\left(\psi - \frac{\pi}{2}\right) \end{pmatrix} \quad (49)$$

When $D_{corner}(t+j\Delta T)=4$, i.e., the closest corner of the host vehicle 101 to the target vehicle 101 is the rear right corner of the host vehicle 101, then $$\begin{pmatrix} \hat{X}_{ad}^{tg}(t+j\Delta T) \\ \hat{Y}_{ad}^{tg}(t+j\Delta T) \end{pmatrix} = \begin{pmatrix} x^m + \sqrt{w_{tg}^2 + l_{tg}^2}\cos\left(\psi + \tan^{-1}\left(\frac{w_{tg}}{l_{tg}}\right)\right) \\ y^m + \sqrt{w_{tg}^2 + l_{tg}^2}\sin\left(\psi + \tan^{-1}\left(\frac{w_{tg}}{l_{tg}}\right)\right) \end{pmatrix} \quad (50)$$

$$\begin{pmatrix} \hat{X}_{ac}^{tg}(t+j\Delta T) \\ \hat{Y}_{ac}^{tg}(t+j\Delta T) \end{pmatrix} = \begin{pmatrix} x^m + l_{tg}\cos(\psi) \\ y^m + l_{tg}\sin(\psi) \end{pmatrix} \quad (51)$$

$$\begin{pmatrix} \hat{X}_{bd}^{tg}(t+j\Delta T) \\ \hat{Y}_{bd}^{tg}(t+j\Delta T) \end{pmatrix} = \begin{pmatrix} x^m + w_{tg}\cos\left(\psi + \frac{\pi}{2}\right) \\ y^m + w_{tg}\sin\left(\psi + \frac{\pi}{2}\right) \end{pmatrix} \quad (52)$$

$$\begin{pmatrix} \hat{X}_{bc}^{tg}(t+j\Delta T) \\ \hat{Y}_{bc}^{tg}(t+j\Delta T) \end{pmatrix} = \begin{pmatrix} x^m \\ y^m \end{pmatrix} \quad (53)$$

For the time from t to t+T, the predicted path r of the corners of the target vehicle 101 may be determined by $$r_{ad}^{tg} = \{(\hat{X}_{ad}^{tg}(t), \hat{Y}_{ad}^{tg}(t)), \ldots, (\hat{X}_{ad}^{tg}(t+T), \hat{Y}_{ad}^{tg}(t+T))\} \quad (54)$$

$$r_{ac}^{tg} = \{(\hat{X}_{ac}^{tg}(t), \hat{Y}_{ac}^{tg}(t)), \ldots, (\hat{X}_{ac}^{tg}(t+T), \hat{Y}_{ac}^{tg}(t+T))\} \quad (55)$$

$$r_{bd}^{tg} = \{(\hat{X}_{bd}^{tg}(t), \hat{Y}_{bd}^{tg}(t)), \ldots, (\hat{X}_{bd}^{tg}(t+T), \hat{Y}_{bd}^{tg}(t+T))\} \quad (56)$$

$$r_{bc}^{tg} = \{(\hat{X}_{bc}^{tg}(t), \hat{Y}_{bc}^{tg}(t)), \ldots, (\hat{X}_{bc}^{tg}(t+T), \hat{Y}_{bc}^{tg}(t+T))\} \quad (57)$$

With the paths r for the corners for the host vehicle 101 and the target vehicle 101, the computing device 110 can determine whether the host vehicle 101 will collide with the target vehicle 101. For the purposes of the following equations, the computing device 110 may use a predetermined collision distance threshold $d_{th} = v_{max}\Delta T$, where $v_{max}$ is a predetermined speed threshold. The collision distance threshold $d_{th}$ defines the distance beyond which the computing device 110 determines that a potential collision is not imminent.

The computing device 110 may also use a predetermined maximum time constant $TT_{max}$, e.g. 100 seconds. The maximum time constant $TT_{max}$ defines a maximum time that the host vehicle 101 and/or the target vehicle 101 may take to reach and/or clear the crossing zone.

The following equations use corner indexes λ, μ to refer to the corners of the host vehicle 101 (λ) and the target vehicle (μ). The indexes λ, μ may be one of 1, 2, 3 or 4, matching the detection corner value $D_{corner}$:

$$D_{corner}, \lambda, \mu = \begin{cases} 1 & \text{front left corner} \\ 2 & \text{front right corner} \\ 3 & \text{rear left corner} \\ 4 & \text{rear right corner} \end{cases} \quad (58)$$

That is, λ=1 refers to the front left corner of the host vehicle 101, μ=3 refers to the rear left corner of the target vehicle 101, etc.

For each step index $$j \in 0 \ldots \frac{T}{\Delta T},$$

the corners λ, μ of the host vehicle 101 and the target vehicle 101 may be a distance d* apart, and one of the distances d*(j, λ, μ) will be a minimum distance, i.e., the closest that the host vehicle 101 will be from the target vehicle 101. Let k be a step index such that $$k \in 0 \ldots \frac{T}{\Delta T},$$

similar to j but increasing independently of j. The index k where that minimum distance occurs can be assigned to an index k* by $$d^*(j, \lambda, \mu) = \min_{k=0 \ldots \frac{T}{\Delta T}} \sqrt{\left(\hat{X}^h_\lambda(t+j\Delta T) - \hat{X}^{tg}_\mu(t+k\Delta T)\right)^2 + \left(\hat{Y}^h_\lambda(t+j\Delta T) - \hat{Y}^{tg}_\mu(t+k\Delta T)\right)^2} \quad (59)$$

$$k^*(j, \lambda, \mu) = \operatorname*{argmin}_{k=0 \ldots \frac{T}{\Delta T}} \sqrt{\left(\hat{X}^h_\lambda(t+j\Delta T) - \hat{X}^{tg}_\mu(t+k\Delta T)\right)^2 + \left(\hat{Y}^h_\lambda(t+j\Delta T) - \hat{Y}^{tg}_\mu(t+k\Delta T)\right)^2} \quad (60)$$

With the array of minimum distances d*, an absolute minimum distance from the host path to the target path d between any two corners λ, μ and the index of that point j may be determined as the minimum of d*:

$$d^{**}(\lambda, \mu) = \min_{j=0 \ldots \frac{T}{\Delta T}} d^*(j, \lambda, \mu) \quad (61)$$

$$j^{**}(j, \lambda, \mu) = \operatorname*{argmin}_{j=0 \ldots \frac{T}{\Delta T}} d^*(j, \lambda, \mu) \quad (62)$$

With the minimum distance d, the computing device 110 may calculate whether the host vehicle 101 will potentially collide with the target vehicle 101 and/or whether the host vehicle 101 or the target vehicle 101 will clear the crossing zone. If $d^{}(\lambda, \mu) > d_{th}$, i.e., the shortest distance between the host vehicle 101 and the target vehicle 101 is greater than a threshold distance, then there is likely no threat of a collision between the host vehicle 101 and the target vehicle 101, and the crossing flag $F_{crossing}$ and time to vehicle $TTV_h, TTV_{tg}$ values, i.e., the time for the host vehicle 101 to reach the target vehicle 101 ($TTV_h$) and the time for the target vehicle 101 to reach the host vehicle 101 ($TTV_{tg}$) are reset to predetermined constants:

$$F_{crossing}(\lambda, \mu) = 0 \quad (63)$$

$$TTV_h(\lambda, \mu) = TT_{max} \quad (64)$$

$$TTV_{tg}(\lambda, \mu) = TT_{max} \quad (65)$$

If $d^{}(\lambda, \mu) \leq d_{th}$ for some pair of corners λ, μ, then the crossing flag is set to 1 and the time to vehicle is determined based on the indexes j, k* determined above:

$$F_{crossing}(\lambda, \mu) = 1 \quad (66)$$

$$TTV_h(\lambda, \mu) = j^{**}(\lambda, \mu) \cdot \Delta T \quad (67)$$

$$TTV_{tg}(\lambda, \mu) = k^*(j^{**}(\lambda, \mu), \lambda, \mu) \cdot \Delta T \quad (68)$$

The path crossing indicator $F_{crossing}(t)$ is set to the maximum value of $F_{crossing}$ for all pairs of corners λ, μ:

$$F_{crossing}(t) = \max_{\lambda, \mu = 1, 2, 3, 4} F_{crossing}(\lambda, \mu) \quad (69)$$

The computing device 110 may then calculate the time to reach the crossing zone TTRe and the time to clear the crossing zone TTCl for the host vehicle 101 and the target vehicle 101 at a time t. If $F_{crossing}(t) = 0$, i.e, there is likely no potential for a collision, then the times to reach and clear are set to a predetermined constant:

$$TTRe_h(t) = TTCl_h(t) = TTRe_{tg}(t) = TTCl_{tg}(t) = TT_{max} \quad (70)$$

If $F_{crossing}(t) = 1$, then there may be a possible collision between the host vehicle 101 and the target vehicle 101. To determine whether the path of the host vehicle 101 will cross the path of the target vehicle 101, the computing device may determine the time for the host vehicle 101 to reach the target vehicle 101 path $TTRe_h$ and the corners ($\lambda_{Re,h}, \mu_{Re,h}$) that may meet:

$$TTRe_h(t) = \max_{\lambda, \mu = 1, 2, 3, 4} TTV_h(\lambda, \mu) \quad (71)$$

$$(\lambda_{Re,h}(t), \mu_{Re,h}(t)) = \operatorname*{argmin}_{\lambda, \mu = 1, 2, 3, 4} TTV_h(\lambda, \mu) \quad (72)$$

The time for the host vehicle 101 to clear the target vehicle 101 path $TTRe_h$ and the corresponding corners ($\lambda_{Cl,h}, \mu_{Cl,h}$) may be determined by:

$$TTCl_h(t) = \max_{\lambda, \mu = 1, 2, 3, 4} F_{crossing}(t) \cdot TTV_h(\lambda, \mu) \quad (73)$$

$$(\lambda_{Cl,h}(t), \mu_{Cl,h}(t)) = \operatorname*{argmax}_{\lambda, \mu = 1, 2, 3, 4} F_{crossing}(t) \cdot TTV_h(\lambda, \mu) \quad (74)$$

The time for the target vehicle 101 to reach the host vehicle 101 $TTRe_{tg}$, time for the target vehicle 101 to clear the path of the host vehicle 101 $TTCl_{tg}$, and the corresponding corner pairs may be similarly determined:

$$TTRe_{tg}(t) = \min_{\lambda,\mu=1,2,3,4} TTV_{tg}(\lambda, \mu) \quad (75)$$

$$(\lambda_{Re,tg}(t), \mu_{Re,tg}(t)) = \operatorname*{argmin}_{\lambda,\mu=1,2,3,4} TTV_{tg}(\lambda, \mu) \quad (76)$$

$$TTCl_{tg}(t) = \max_{\lambda,\mu=1,2,3,4} F_{crossing}(t) \cdot TTV_{tg}(\lambda, \mu) \quad (77)$$

$$(\lambda_{Cl,tg}(t), \mu_{Cl,tg}(t)) = \operatorname*{argmax}_{\lambda,\mu=1,2,3,4} F_{crossing}(t) \cdot TTV_{tg}(\lambda, \mu) \quad (78)$$

With all of these values, the computing device 110 may then determine the threat estimation for the host vehicle 101 and the target vehicle 101. Specifically, the computing device 110 may determine the acceleration threat number ATN, the brake threat number BTN, and the steering threat number STN for the host vehicle 101 and the target vehicle 101, and based on the threat numbers ATN, BTN, STN, which may be combined into a single threat number TN, actuate vehicle 101 countermeasures.

The brake threat number BTN may be calculated as two separate values, one representing the brake threat number for braking the host vehicle 101 to let the target vehicle 101 pass, $BTN_p$, and the other representing the brake threat number for braking to stop the host vehicle 101, $BTN_s$. Depending on the trajectory of the target vehicle 101, the brake threat numbers for stopping the host vehicle 101 and slowing the host vehicle 101 to allow the target vehicle 101 to pass may be different, i.e., $BTN_p$ may not always equal $BTN_s$.

The steering threat number STN may be calculated as two separate values, one representing the steering threat number for steering the host vehicle 101 to clear the crossing zone before the target vehicle 101 reaches the crossing zone (i.e., oversteer), $STN_o$, and the other representing the steering threat number for steering the host vehicle 101 to allow the target vehicle 101 to clear the crossing zone first (i.e., countersteer), $STN_c$. Depending on the trajectory of the target vehicle 101, the steering threat number for oversteer and countersteer of the host vehicle 101 may be different, i.e., $STN_o$ may not always equal $STN_c$.

The computing device 110 may have a predetermined maximum longitudinal acceleration value $Acc_{long}^{max}$ and a predetermined maximum lateral acceleration value $Acc_{lat}^{max}$ for the host vehicle 101 and the target vehicle 101. The computing device 110 may use a time step index K in the following equations. For at time $t_K$, the computing device 110 may acquire the velocities of the host vehicle 101, $v_h(t_K)$, and the target vehicle 101, $v_{tg}(t_K)$, from the data collectors 105. Using the equations above, the computing device 110 may then determine the path crossing flag $F_{crossing}(t_K)$ and the time to reach and clear values TTRe, TTCl for the time $t_K$. If $F_{crossing}(t_K)=0$, then there is likely no potential path crossing and thus no potential threat, and the threat numbers are all set to 0:

$$ATN_h(t_K)=BTN_{p,h}(t_K)=BTN_{s,h}(t_K)=STN_{o,h}(t_K)=STN_{c,h}(t_K)=0 \quad (79)$$

$$ATN_{tg}(t_K)=BTN_{p,tg}(t_K)=BTN_{s,tg}(T_K)=STN_{o,tg}(t_K)=STN_{c,tg}(t_K)=0 \quad (80)$$

If the crossing flag $F_{crossing}(t_K)=1$, then there may be a potential path crossing. The computing device 110 compares the time for the target vehicle 101 to clear the crossing zone $TTCl_{tg}$ to the time for the host vehicle 101 to reach the crossing zone $TTRe_h$ to determine whether the target vehicle 101 will clear the crossing zone before the host vehicle 101 will reach the crossing zone. The computing device 110 also compares the time for the host vehicle 101 to clear the crossing zone $TTCl_h$ to the time for the target vehicle 101 to reach the crossing zone $TTRe_{tg}$ to determine whether the host vehicle 101 will clear the crossing zone before the target vehicle 101 will reach the crossing zone. If the time for either vehicle 101 to clear the crossing zone is less than the time for the other vehicle 101 to reach the crossing zone, i.e., $$TTCl_{tg}(t_K) \le TTRe_h(t_K) \text{ or } TTCl_h(t_K) \le TTRe_{tg}(t_K) \quad (81)$$

then one of the vehicles 101 will clear the crossing zone before the other vehicle 101 will reach the crossing zone. Thus, there is no potential path crossing and no potential threat, and the threat numbers remain 0 as shown above.

Otherwise, the computing device 110 may calculate the threat numbers for the host vehicle 101 and the target vehicle 101. For clarity of the following equations, let $$J_1 = \frac{TTRe_h(t_K)}{\Delta T}, J_2 = \frac{TTCl_h(t_K)}{\Delta T}, J_3 = \frac{TTRe_{tg}(t_K)}{\Delta T}, \quad (82)$$
$$J_4 = \frac{TTCl_{tg}(t_K)}{\Delta T}$$

$$\lambda_1 = \lambda_{Re,h}(t_K), \lambda_2 = \lambda_{Cl,h}(t_K), \mu_1 = \mu_{Re,tg}(t_K), \mu_2 = \mu_{Cl,tg}(t_K) \quad (83)$$

The computing device 110 may determine the acceleration threat number ATN for the host vehicle 101. For indexes $j=j_1,j_2$, let $j_1=J_3,j_2=J_2-1$. The computing device 110 may calculate a characteristic distance D* and a characteristic acceleration A* for the host vehicle 101 to determine the acceleration threat number $ATN_h$:

$$D_h^*(t_K) = \sum_{j=j_1}^{j_2} \sqrt{\left(\hat{X}_{\lambda_2}^h(t_K+(j+1)\Delta T) - \hat{X}_{\lambda_2}^h(t_K+j\Delta T)\right)^2 + \left(\hat{Y}_{\lambda_2}^h(t_K+(j+1)\Delta T) - \hat{Y}_{\lambda_2}^h(t_K+j\Delta T)\right)^2} \quad (84)$$

$$A_h^*(t_K) = \frac{2D_h^*(t_K)}{(TTRe_{tg}(t_K))^2} \quad (85)$$

$$ATN_h(t_K) = \frac{A_h^*(t_K)}{Acc_{long,h}^{max}} \quad (86)$$

The computing device 110 may determine the braking threat number for braking the host vehicle 101 to allow the target vehicle 101 to pass, $BTN_p$. Let indexes $j_1=J_1,j_2=J_4-1$.

$$D_h^*(t_K) = \sum_{j=j_1}^{j_2} \sqrt{\left(\hat{X}_{\lambda_1}^h(t_K+(j+1)\Delta T) - \hat{X}_{\lambda_1}^h(t_K+j\Delta T)\right)^2 + \left(\hat{Y}_{\lambda_1}^h(t_K+(j+1)\Delta T) - \hat{Y}_{\lambda_1}^h(t_K+j\Delta T)\right)^2} \quad (87)$$

$$A_h^*(t_K) = \frac{2D_h^*(t_K)}{(TTRe_{tg}(t_K))^2} \quad (88)$$

$$BTN_{p,h}(t_K) = \frac{A_h^*(t_K)}{Acc_{long,h}^{max}} \quad (89)$$

The computing device 110 may determine the braking threat number for braking the host vehicle 101 to stop the host vehicle, $BTN_s$. Let indexes $j_1=0,j_2=J_1-1$.

$$D_h^*(t_K) = \sum_{j=j_1}^{j_2} \sqrt{\begin{array}{l}(\hat{X}_{\lambda_1}^h(t_K+(j+1)\Delta T) - \hat{X}_{\lambda_1}^h(t_K+j\Delta T))^2 + \\ (\hat{Y}_{\lambda_1}^h(t_K+(j+1)\Delta T) - \hat{Y}_{\lambda_1}^h(t_K+j\Delta T))^2\end{array}} \quad (90)$$

$$A_h^*(t_K) = \frac{v_h(t_K)^2}{2D_h^*(t_K)} \quad (91)$$

$$BTN_{s,h}(t_K) = \frac{A_h^*(t_K)}{Acc_{long,h}^{max}} \quad (92)$$

The computing device 110 may determine the steering threat number for oversteer, i.e., steering the host vehicle 101 to clear the crossing zone before the target vehicle 101 reaches the crossing zone, $STN_o$. Let indexes $j_1=J_3, j_2=J_2-1$.

$$D_h^*(t_K) = \sum_{j=j_1}^{j_2} \sqrt{\begin{array}{l}(\hat{X}_{\mu_1}^{tg}(t_K+(j+1)\Delta T) - \hat{X}_{\mu_1}^{tg}(t_K+j\Delta T))^2 + \\ (\hat{Y}_{\mu_1}^{tg}(t_K+(j+1)\Delta T) - \hat{Y}_{\mu_1}^{tg}(t_K+j\Delta T))^2\end{array}} \quad (93)$$

$$A_h^*(t_K) = \frac{2D_h^*(t_K)}{(TTRe_{tg}(t_K))^2} \quad (94)$$

$$STN_{o,h}(t_K) = \frac{A_h^*(t_K)}{Acc_{lat,h}^{max}} \quad (95)$$

The computing device 110 may determine the steering threat number for countersteer, i.e., steering the host vehicle 101 to allow the target vehicle to clear the crossing zone, $STN_c$. Let indexes $j_1=J_1, j_2=J_4-1$.

$$D_h^*(t_K) = \sum_{j=j_1}^{j_2} \sqrt{\begin{array}{l}(\hat{X}_{\mu_2}^{tg}(t_K+(j+1)\Delta T) - \hat{X}_{\mu_2}^{tg}(t_K+j\Delta T))^2 + \\ (\hat{Y}_{\mu_2}^{tg}(t_K+(j+1)\Delta T) - \hat{Y}_{\mu_2}^{tg}(t_K+j\Delta T))^2\end{array}} \quad (96)$$

$$A_h^*(t_K) = \frac{2D_h^*(t_K)}{(TTRe_{tg}(t_K))^2} \quad (97)$$

$$STN_{c,h}(t_K) = \frac{A_h^*(t_K)}{Acc_{lat,h}^{max}} \quad (98)$$

The computing device 110 may determine the acceleration threat number for accelerating the target vehicle 101 to pass the host vehicle 101, $ATN_{tg}$. Let indexes $j_1=J_1, j_2=J_4-1$.

$$D_{tg}^*(t_K) = \sum_{j=j_1}^{j_2} \sqrt{\begin{array}{l}(\hat{X}_{\mu_2}^{tg}(t_K+(j+1)\Delta T) - \hat{X}_{\mu_2}^{tg}(t_K+j\Delta T))^2 + \\ (\hat{Y}_{\mu_2}^{tg}(t_K+(j+1)\Delta T) - \hat{Y}_{\mu_2}^{tg}(t_K+j\Delta T))^2\end{array}} \quad (99)$$

$$A_{tg}^*(t_K) = \frac{2D_{tg}^*(t_K)}{(TTRe_h(t_K))^2} \quad (100)$$

$$ATN_{tg}(t_K) = \frac{A_{tg}^*(t_K)}{Acc_{long,tg}^{max}} \quad (101)$$

The computing device 110 may determine the braking threat number for braking the target vehicle 101 to let the host vehicle 101 pass the target vehicle 101, $BTN_{p,tg}$. Let indexes $j_1=J_3, j_2=J_2-1$.

$$D_{tg}^*(t_K) = \sum_{j=j_1}^{j_2} \sqrt{\begin{array}{l}(\hat{X}_{\mu_1}^{tg}(t_K+(j+1)\Delta T) - \hat{X}_{\mu_1}^{tg}(t_K+j\Delta T))^2 + \\ (\hat{Y}_{\mu_1}^{tg}(t_K+(j+1)\Delta T) - \hat{Y}_{\mu_1}^{tg}(t_K+j\Delta T))^2\end{array}} \quad (102)$$

$$A_{tg}^*(t_K) = \frac{2D_{tg}^*(t_K)}{(TTRe_{tg}(t_K))^2} \quad (103)$$

$$BTN_{p,tg}(t_K) = \frac{A_{tg}^*(t_K)}{Acc_{long,tg}^{max}} \quad (104)$$

The computing device 110 may determine the braking threat number for braking the target vehicle 101 to a stop, $BTN_{s,tg}$. Let indexes $j_1=0, j_2=J_3-1$.

$$D_{tg}^*(t_K) = \sum_{j=j_1}^{j_2} \sqrt{\begin{array}{l}(\hat{X}_{\mu_1}^{tg}(t_K+(j+1)\Delta T) - \hat{X}_{\mu_1}^{tg}(t_K+j\Delta T))^2 + \\ (\hat{Y}_{\mu_1}^{tg}(t_K+(j+1)\Delta T) - \hat{Y}_{\mu_1}^{tg}(t_K+j\Delta T))^2\end{array}} \quad (105)$$

$$A_{tg}^*(t_K) = \frac{(v_{tg}(t_K))^2}{2D_{tg}^*(t_K)} \quad (106)$$

$$BTN_{s,tg}(t_K) = \frac{A_{tg}^*(t_K)}{Acc_{long,tg}^{max}} \quad (107)$$

The computing device 110 may determine a steering threat number for oversteer, i.e., steering the target vehicle 101 to clear the crossing zone before the host vehicle 101 reaches the crossing zone, $STN_o$. Let $j_1=J_1, j_2=J_4-1$.

$$D_{tg}^*(t_K) = \sum_{j=j_1}^{j_2} \sqrt{\begin{array}{l}(\hat{X}_{\lambda_1}^h(t_K+(j+1)\Delta T) - \hat{X}_{\lambda_1}^h(t_K+j\Delta T))^2 + \\ (\hat{Y}_{\lambda_1}^h(t_K+(j+1)\Delta T) - \hat{Y}_{\lambda_1}^h(t_K+j\Delta T))^2\end{array}} \quad (108)$$

$$A_{tg}^*(t_K) = \frac{2D_{tg}^*(t_K)}{(TTRe_h(t_K))^2} \quad (109)$$

$$STN_{o,tg}(t_K) = \frac{A_{tg}^*(t_K)}{Acc_{lat,tg}^{max}} \quad (110)$$

The computing device 110 may determine the steering threat number for countersteer, i.e., steering the host vehicle 101 to allow the target vehicle to clear the crossing zone, $STN_c$. Let indexes $j_1=J_3, j_2=J_2-1$.

$$D_{tg}^*(t_K) = \sum_{j=j_1}^{j_2} \sqrt{\begin{array}{l}(\hat{X}_{\lambda_2}^h(t_K+(j+1)\Delta T) - \hat{X}_{\lambda_2}^h(t_K+j\Delta T))^2 + \\ (\hat{Y}_{\lambda_2}^h(t_K+(j+1)\Delta T) - \hat{Y}_{\lambda_2}^h(t_K+j\Delta T))^2\end{array}} \quad (111)$$

$$A_{tg}^*(t_K) = \frac{2D_{tg}^*(t_K)}{(TTRe_{tg}(t_K))^2} \quad (112)$$

$$STN_{c,tg}(t_K) = \frac{A_{tg}^*(t_K)}{Acc_{lat,tg}^{max}} \quad (113)$$

The computing device 110 may calculate the overall threat numbers $TN_h$, $TN_{tg}$ as the minimum of the specific threat numbers:

$$TN_h(t_K) = \min\begin{pmatrix} ATN_h(t_K), BTN_{p,h}(t_K), BTN_{s,h}(t_K), \\ STN_{o,h}(t_K), STN_{c,h}(t_K) \end{pmatrix} \quad (114)$$

$$TN_{tg}(t_K) = \min\begin{pmatrix} ATN_{tg}(t_K), BTN_{p,tg}(t_K), BTN_{s,tg}(t_K), \\ STN_{o,tg}(t_K), STN_{c,tg}(t_K) \end{pmatrix} \quad (115)$$

$$TN(t_K) = \min(TN_h(t_K), TN_{tg}(t_K)) \quad (116)$$

The computing device 110 may determine the threat estimation TN for all times $t_K$ where $$K = 0 \ldots \frac{T}{\Delta T}.$$

Figure 2:
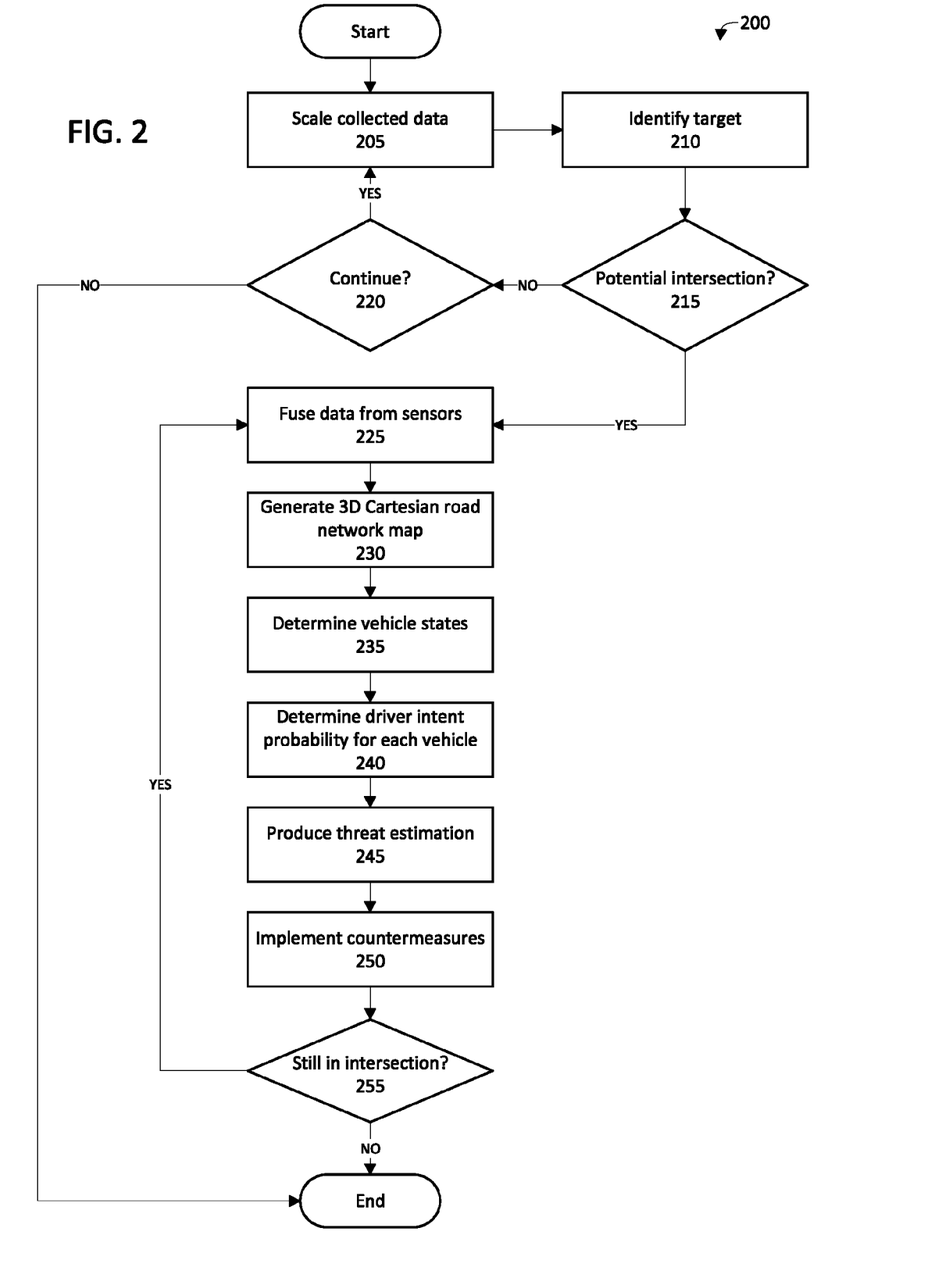
FIG. 2 illustrates a process flow for the system of FIG. 1.

FIG. 2 illustrates a process 200 for detecting a potential collision and mitigating the collision. The process 200 starts in a block 205, in which the computing device 110 scales collected data, i.e., identifies some or all of the available data collectors 105 to be used to collect data for detecting potential intersections, e.g., as described with respect to this process 200. For example, the computing device 110 may select to use the left side collectors 160 but not the right side collectors 165, or may select to use a particular type of collectors 105, e.g., at night or during heavy precipitation camera collectors 105 may not be useful, but other collectors 105 may be. In general, selected data collectors 105 may vary depending on various factors, e.g., the target vehicle trajectory, the host vehicle trajectory, the surrounding environment, etc. Specifically, radar and lidar may be used in conjunction for longitudinal trajectory support. Lidar and the camera may be used to estimate the transition from longitudinal to lateral movement, e.g., when turning, as the camera and lidar can detect planes of the target vehicle which may change shape during the intersection.

Next, in a block 210, the computer 105 uses data from one or more data collectors 105 selected in the block 205 to identify a target object or objects, e.g., a target vehicle, a target guiderail on a roadway, and obstruction in a roadway, etc. For example, various data collectors 110 can be used to determine that a target object, e.g., another vehicle, is within a predetermined distance, e.g., ten meters, twenty meters, etc., of the host vehicle 101. Further, data collectors 105 could provide data indicating that the target object was closing on the host vehicle 101, potentially altering its course, accelerating, decelerating, etc. Based on such data, the computer 110 could make a preliminary determination that an object could intersect with the host vehicle 101.

Next, in a block 215, the computing device 110 determines whether there is a potential intersection between a host vehicle and the target object identified in the block 210. If not, or if no target object was identified in the block 210, the process 200 proceeds to a block 220. If a potential intersection is identified, then the process 200 proceeds to a block 225. The identification of a potential intersection may be performed in a variety of ways according to data collected from one more sensor data collectors 105. For example, a closing speed above a certain threshold, an acceleration or deceleration above a threshold, a turning rate, etc., of a target vehicle may be used. In addition, the identification may consider the amount of time spent sensing or since the data collectors 105 last collected data.

Next, in a block 220, the computing device 110 determines whether to continue the process 200. For example, if the vehicle 101 stops, is powered off, or parked, the process 200 may be ended. If the process 200 is to continue, the process 200 proceeds to the block 205. If not, the process 200 ends.

Next, in the block 225, the computing device 110 fuses or integrates the data collected from the data collectors 105 selected in block 205. Such fusion, or integration of collected data provides for situational awareness of a host vehicle 101 state with respect to a target vehicle and/or other potential target objects.

Next, in a block 230, the computing device 110 generates a digital road network map based on data fused from the data collectors 105. The digital road network map in an exemplary implementation is one of a 2-dimensional X-Y Cartesian map or a 3-dimensional X-Y-Z Cartesian map of an environment surrounding a vehicle 101, e.g., within a square or rectangle having a center at the center of the vehicle, distances from the center being predetermined, e.g., twenty meters, fifty meters, etc. As described in the equations above, the host vehicle 101 and the target vehicle 101 may move in an X-Y plane, and the data collectors 105 may be positioned at different elevations along a Z axis orthogonal to the X-Y plane. The computer 110 can develop a two-dimensional X-Y map and/or a three-dimensional X-Y-Z map to account for the movement of the vehicles 101 and the position of the data collectors 105. The X-Y and X-Y-Z Cartesian coordinate road network maps advantageously allow for more accurate lateral target tracking and selection comparted to conventional polar coordinate tracking and target selection systems. The map is generated by using fused data from data collectors 105 to identify a location, shape, movement, etc., of one more target objects with respect to the vehicle 101, as well as information, e.g., map or navigation information stored in a memory of the computer 110, received from a remote site, etc. Additionally, but not necessarily, a navigation system or the like could be used to generate an event horizon, such as is known, to provide data for the digital map. Depending on the number and/or quality of data collectors 105 used in the data fusion of block 220, the digital road network map may have a partial field of view or a full field of view of the traffic and environment surrounding the host vehicle. That is, data of sufficient reliability may be available only for a partial view.

Next, in a block 235, the computing device 110 determines states of the host vehicle 101 and the target object, e.g., vehicle. The vehicle states typically include one or more velocity measurements, including a lateral velocity and a longitudinal velocity, as well as an acceleration, including a lateral acceleration and a longitudinal acceleration. The computing device 110 may use the digital road network map to determine the lateral velocity and the lateral acceleration of the host vehicle and the target vehicle with respect to coordinates on the map.

Next, in a block 240, the computing device 110 determines a driver intent probability for the target vehicle and the host vehicle, generally by using the fused data and vehicle signals from driver controls. A driver intent probability is a probability that a driver of a vehicle such as a host vehicle 101 will follow a particular trajectory, or will alter the trajectory. For example, steering angle, throttle state, braking, and the like can all be used to estimate a probability that a driver will follow a current projected trajectory, or will change the trajectory. External factors such as road conditions, weather, type of road or driving surface (e.g., a parking lot), etc., may also be used. A driver intent probability may be expressed as a percentage, i.e., a likelihood that a vehicle such as a host vehicle 101 will continue of a present trajectory. Further, the computing device 110 may track and estimate the driver intent probability of host and target vehicles on an ongoing basis.

Next, in a block 245, the computing device 110 determines a threat estimation for an impending collision. The threat estimation is a prediction of whether a target object will intersect or collide with the host vehicle 101 based on the fused data from the data collectors 105, the vehicle states, the host driver intent probability, and/or the target driver intent probability. Furthermore, the threat estimation may include location-specific estimations. For example, the target vehicle may primarily collide with the left side of the vehicle 101, and the threat estimation may include an estimation specific to the left side of the vehicle 101. The threat estimation may also incorporate traffic flow and lane configurations for the current road. The threat estimation may thus account for a plurality of traffic scenarios and potential intersections. The level of scenarios may be proportional to the amount and complexity of the sensor load and data fusion, as well as the target vehicle driver intent probability.

The computing device 110 may calculate a steering threat number (STN), a brake threat number (BTN) and an acceleration threat number (ATN) for both the host vehicle and the target vehicle. As described above, the BTN is a measure of a change in longitudinal acceleration to allow one of the host vehicle to stop or the object to pass the host vehicle, the STN being a measure of a change in lateral acceleration to allow one of the host vehicle and the object to clear a crossing zone, and the ATN is a measure of a specific longitudinal acceleration to allow one of the host vehicle and the object to pass the other of the host vehicle and the object That is, the BTN is a measure of longitudinal acceleration of the vehicle, and may be determined with data from the data collectors 105. The STN is a measure of lateral acceleration of the vehicle. The ATN is a measure of throttle changes. The computing device may use STN, BTN, and/or ATN to determine the trajectory of the host vehicle and the target vehicle and thus produce the threat estimation.

The computing device 110 may also incorporate traffic flow and lane configurations on a roadway at an infrastructure level intersection, or an point on a roadway where two or more vehicle have estimated trajectory crossing points, e.g. an entrance to a business, a driveway, etc., and can adjust the sensor load and data fusion with greater situational awareness of the vehicle path intersection. The computing device 110 may further incorporate roadway traffic regulations to determine the host and target driver intent probability and the threat estimation. Combining the traffic regulations with the driver intent probabilities, as well as other vehicle trajectories sensed in the environment and potential map data fused with sensed data to provide road level fusion, the system 100 can use different threat assessment techniques based on the different common intersecting traffic behavior.

Next, in a block 250, the computing device 110 may implement countermeasures based on the threat estimation, such as the safety systems 112, as described more fully below with respect to FIG. 3.

Next, in a block 255, the computing device 110 determines whether the host vehicle and the target vehicle remain on an intersection path. This determination may be based on the threat estimation, e.g., if the threat estimation is below a certain threshold, the vehicle path intersection may end. If the host vehicle is still in the vehicle path intersection, the process 200 returns to block 225. If the host vehicle is no longer in the vehicle path intersection, the process 200 ends.

Figure 3:
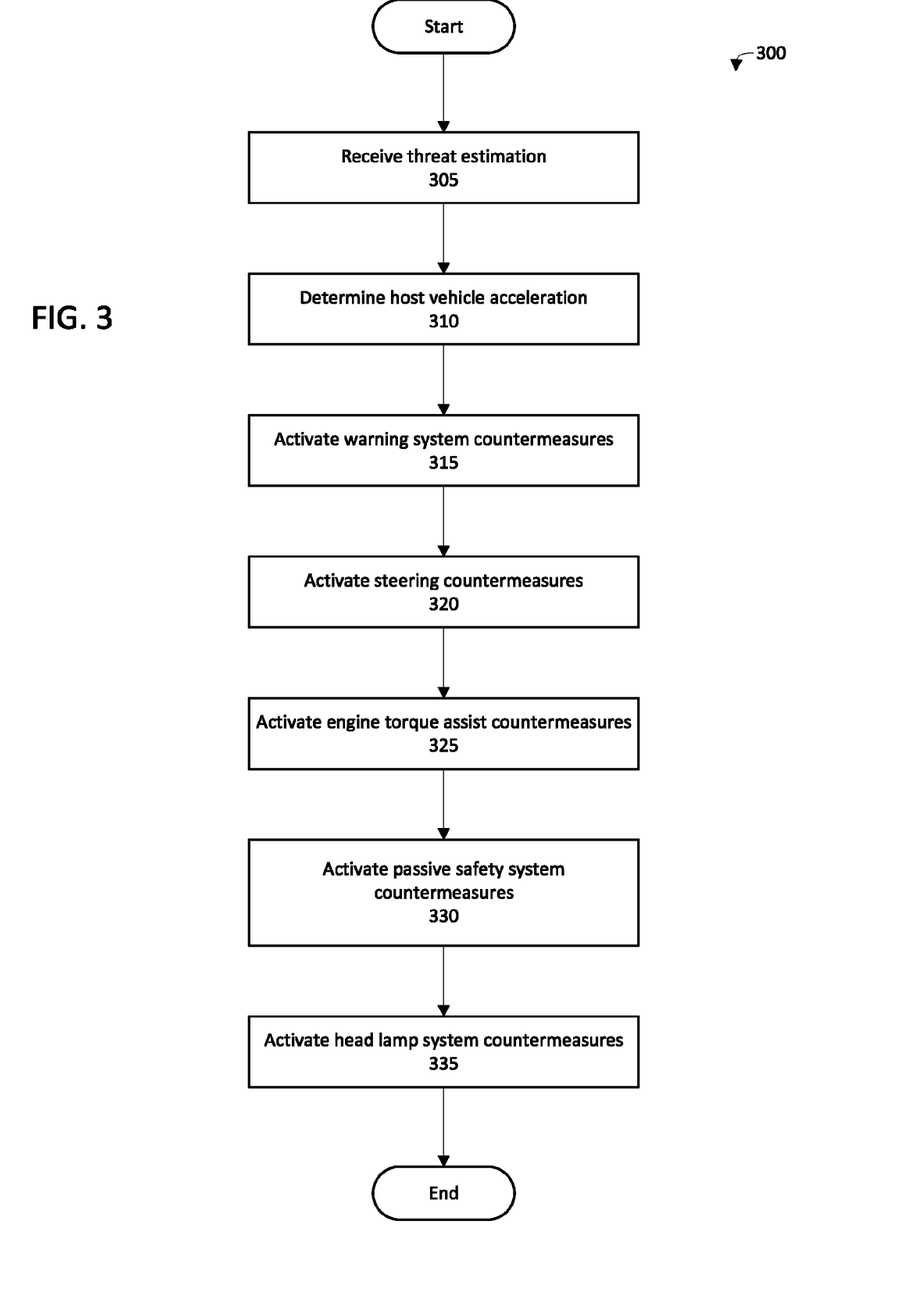
FIG. 3 illustrates another process flow for the system of FIG. 1.

FIG. 3 shows a process 300 for implementing the countermeasures of block 250. The process 300 starts in a block 305, where the computing device 110 receives the threat estimation determined in block 245 of FIG. 2.

Next, in a block 310, the data collectors 105 determine the host vehicle 101 lateral and longitudinal acceleration. The host vehicle acceleration, in conjunction with the target vehicle threat estimation, may further predict the impending collision and mitigation countermeasures. Based on the host vehicle 101 acceleration and the threat estimation, the computing device 110 may decrease at least one of the host vehicle 101 lateral and longitudinal acceleration. For example, if the time to reach the crossing zone for the host vehicle 101 and the time to reach the crossing zone for the target vehicle 101 would result in a collision, the computing device 110 may decelerate the host vehicle 101 so that the time to reach the crossing zone for the host vehicle 101 is greater than the time to clear the crossing zone for the target vehicle 101. This allows the target vehicle 101 to clear the crossing zone before the host vehicle 101 reaches the crossing zone, avoiding the collision.

Next, in a block 315, based on the threat estimation, the computing device 110 activates warning system countermeasures. The computing device 110 may use the warning system 120 to deliver a warning to the driver of the host vehicle. The warning may be any or all of audio, visual, and/or haptic. The warning system countermeasures may be suppressed if the threat estimation would increase as a result.

Next, in a block 320, based on the threat estimation and the host vehicle acceleration, the computing device 110 activates steering countermeasures. Specifically, the computing device 110 may recommend to the driver of the host vehicle to use the steering assist system 125 to avoid the target vehicle. Alternatively, the computing device 110 may automatically activate the steering assist system 125. The steering assist system countermeasures may include steering assist control support, less or greater steering sensitivity for a given host steering wheel input, automated steering at various lateral acceleration levels at various pre-collision timing, and/or suppression of the level of steering sensitivity changes. In particular, the threat estimation may dynamically adjust based on the host vehicle's actions, and the steering assist system may adjust the steering assist countermeasures to actively reduce the threat estimation.

Next, in a block 325, the computing device 110 activates engine torque assist countermeasures. Specifically, the computing device 110 may automatically activate the torque assist system 130. The engine torque assist system countermeasures may include greater or reduced longitudinal acceleration sensitivity for a given host throttle pedal input at various pre-collision timing, and/or suppression of engine torque change that would lead to an increase in the threat estimation, e.g., the host vehicle causing an impact condition to change from a frontal impact to a side impact.

Next, in a block 330, the computing device 110 activates passive safety system countermeasures. Specifically, the computing device 110 may automatically activate the passive safety system 135, including a plurality of airbags, bolsters, and/or seat belt pretensioners. The computing device 110 may selectively deploy part or all of the passive safety system 135 depending on the driver intent probability. The passive safety system countermeasures include seat belt automatic pretensioning, active head rest deployment, seat track longitudinal position, seat bolster deployment, and/or window closure. The passive safety system countermeasures may be suppressed if the threat estimation would increase as a result.

Next, in a block 335, the computing device 110 activates head lamp system countermeasures. The computing device 110 may automatically activate the head lamp system 140 depending on the driver intent probability. The head lamp system countermeasures include automatic high beam adjustment, head lamp aim, and/or head lamp photometric pattern modification. The head lamp system countermeasures may be suppressed if the threat estimation would increase as a result.

Computing devices 110 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 110 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a computer having a processor and a memory, the memory storing instructions executable by the computer to:
identify a target object;
identify a potential intersection of a host vehicle and the target object;
identify one or more data collectors to provide data for analyzing the intersection;
collect data relating to the host vehicle and the target object from the data collectors;
develop a coordinate map of a surrounding environment based at least in part on the data collected from the host vehicle and the target object;
identify a probable trajectory of the target object based at least in part on the coordinate map;
generate a threat estimation based at least in part on the probable trajectory; and
activate at least one of a plurality of vehicle safety systems based at least in part on a threat estimation obtained by analyzing the map.

2. The system of claim 1, wherein the data include a velocity and an acceleration of the object, wherein the velocity includes at least one of a lateral velocity and a longitudinal velocity, and the acceleration includes at least one of a lateral acceleration and a longitudinal acceleration, and wherein the threat estimation is based on at least one of a brake threat number, a steering threat number, and an acceleration threat number, the brake threat number being a measure of a change in the host vehicle longitudinal acceleration to allow one of the host vehicle to stop or the object to pass the host vehicle, the steering threat number being a measure of a change in the host vehicle lateral acceleration to allow one of the host vehicle and the object to clear a crossing zone, and the acceleration threat number is a measure of a specific longitudinal acceleration to allow one of the host vehicle and the object to pass the other of the host vehicle and the object.

3. The system of claim 2, wherein the at least one vehicle safety system is selectively activated based at least in part on at least one of the lateral velocity, the longitudinal velocity, the lateral acceleration, and the longitudinal acceleration.

4. The system of claim 1, wherein the vehicle safety systems include at least one of brake assist, warning, steering assist, torque assist, passive safety, and head lamp systems.

5. The system of claim 4, wherein the instructions include instructions to adjust a brake sensitivity of the brake assist system based at least in part on the threat estimation.

6. The system of claim 4, wherein the instructions further include instructions to adjust a steering wheel sensitivity of the steering assist system based at least in part on the threat estimation.

7. The system of claim 4, wherein the instructions further include instructions to adjust an acceleration sensitivity of the torque assist system based at least in part on the threat estimation.

8. The system of claim 4, wherein the instructions further include instructions to adjust at least one of a high beam activation, a head lamp aim, and a head lamp photometric pattern of the head lamp system based at least in part on the threat estimation.

9. The system of claim 1, wherein the instructions further include instructions to integrate the map into a digital road network map providing an X-Y-Z Cartesian road network coordinate map.

10. The system of claim 1, wherein the target object is a target vehicle, wherein the instructions further include instructions to use the map to determine a target vehicle driver intent probability based at least in part on the identified probable trajectory of the target vehicle, and a host vehicle driver intent probability, being a measure of a probable trajectory of the host vehicle, and, based at least in part on the target vehicle driver intent probability, produce the threat estimation that is a measure of a probability of a collision between the host vehicle and the target vehicle.

11. A method, comprising:
identifying a target object;
identifying a potential intersection of a host vehicle and the target object;
identifying one or more data collectors to provide data for analyzing the intersection;
collecting data relating to the host vehicle and the target object from the data collectors;
developing a coordinate map of a surrounding environment based at least in part on the data collected from the host vehicle and the target vehicle;
identifying a probable trajectory of the target object based at least in part on the coordinate map;
generating a threat estimation based at least in part on the probable trajectory; and
activating at least one of a plurality of vehicle safety systems based at least in part on the threat estimation.

12. The method of claim 11, wherein the data include a velocity and an acceleration of the target object, wherein the velocity includes at least one of a lateral velocity and a longitudinal velocity, and the acceleration includes at least one of a lateral acceleration and a longitudinal acceleration and wherein the threat estimation is based on at least one of a brake threat number, a steering threat number, and an acceleration threat number, the brake threat number being a measure of a change in the host vehicle longitudinal acceleration to allow one of the host vehicle to stop or the target object to pass the host vehicle, the steering threat number being a measure of a change in the host vehicle lateral acceleration to allow one of the host vehicle and the target object to clear a crossing zone, and the acceleration threat number is a measure of a specific longitudinal acceleration to allow one of the host vehicle and the target object to pass the other of the host vehicle and the target object.

13. The method of claim 12, wherein the at least one vehicle safety system is selectively activated based at least in part on the lateral velocity, the longitudinal velocity, the lateral acceleration, and the longitudinal acceleration.

14. The method of claim 11, wherein the vehicle safety systems include at least one of brake assist, warning, steering assist, torque assist, passive safety, and head lamp systems.

15. The method of claim 14, further comprising adjusts a brake sensitivity of the brake assist system based at least in part on the threat estimation.

16. The method of claim 14, further comprising adjusts a steering wheel sensitivity of the steering assist system based at least in part on the threat estimation.

17. The method of claim 14, further comprising adjusting an acceleration sensitivity of the torque assist system based at least in part on the threat estimation.

18. The method of claim 14, further comprising adjusting at least one of a high beam activation, a head lamp aim, and a head lamp photometric pattern of the head lamp system based at least in part on the threat estimation.

19. The method of claim 11, further comprising integrating the map into a digital road network map providing an X-Y-Z Cartesian road network coordinate map.

20. The method of claim 11, wherein the target object is a target vehicle, the method further comprising using the map to determine a target vehicle driver intent probability that is a measure of a probable trajectory of the target vehicle, and a host vehicle driver intent probability based at least in part on the probable trajectory of the host vehicle, and, based at least in part on the target vehicle driver intent probability, generating the threat estimation that is a measure of a probability of a collision between the host vehicle and the target vehicle.

* * * * *